United States Patent
Bartfai-Walcott et al.

(10) Patent No.: US 9,191,283 B2
(45) Date of Patent: Nov. 17, 2015

(54) PRIORITIZING DATA PACKETS ASSOCIATED WITH APPLICATIONS RUNNING IN A NETWORKED COMPUTING ENVIRONMENT

(71) Applicant: International Business Machines Corporation, Armonk, NY (US)

(72) Inventors: Katalin K. Bartfai-Walcott, El Dorado Hills, CA (US); Gregory J. Boss, Saginaw, MI (US); Christopher J. Dawson, Arlington, VA (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 14/014,989

(22) Filed: Aug. 30, 2013

(65) Prior Publication Data

US 2014/0173098 A1    Jun. 19, 2014

Related U.S. Application Data

(63) Continuation of application No. 13/185,587, filed on Jul. 19, 2011, now Pat. No. 8,539,074.

(51) Int. Cl.
*G06F 15/173* (2006.01)
*H04L 12/24* (2006.01)
*H04L 12/851* (2013.01)
*H04L 12/859* (2013.01)

(52) U.S. Cl.
CPC ........ *H04L 41/5012* (2013.01); *H04L 47/2425* (2013.01); *H04L 47/2475* (2013.01)

(58) Field of Classification Search
USPC ........... 709/223, 224, 225, 226; 718/100, 103
See application file for complete search history.

(56) References Cited

U.S. PATENT DOCUMENTS

| | | | |
|---|---|---|---|
| 6,205,149 B1 | 3/2001 | Lemaire et al. | |
| 7,075,927 B2 | 7/2006 | Mo et al. | |
| 7,290,028 B2 | 10/2007 | Brabson et al. | |
| 7,376,082 B2 | 5/2008 | Barzilai et al. | |
| 7,797,406 B2 | 9/2010 | Patel et al. | |
| 8,098,583 B2 * | 1/2012 | Cahn ............................ | 370/235 |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Viet Vu
(74) *Attorney, Agent, or Firm* — William E. Schiesser; Keohane & D'Alessandro PLLC; Hunter E. Webb

(57) ABSTRACT

The present invention provides an approach for prioritizing a set of data packets associated with an application running in a networked computing environment. An SLA associated with a particular application and at least one other SLA associated with at least one other application are accessed. A proposed modification to a priority of a set of data packets associated with the particular application is then determined based on a comparison of a current performance of the set of data packets versus a specified performance of the set of data packets as set forth in the SLA. An effect of the proposed modification on a capability of the particular application to meet a set of terms of the SLA, and of the at least one other application to meet terms of the at least one other SLA will be evaluated. It will then be determined whether to implement the proposed modification.

20 Claims, 8 Drawing Sheets

(56) References Cited

U.S. PATENT DOCUMENTS

| | | | |
|---|---|---|---|
| 8,264,971 | B2 | 9/2012 | Alfano et al. |
| 2001/0038639 | A1* | 11/2001 | McKinnon et al. ............ 370/468 |
| 2002/0188732 | A1 | 12/2002 | Buckman et al. |
| 2004/0022191 | A1 | 2/2004 | Bernet et al. |
| 2007/0156919 | A1 | 7/2007 | Potti et al. |
| 2009/0100431 | A1 | 4/2009 | Doyle et al. |
| 2009/0300632 | A1 | 12/2009 | Falcon et al. |

OTHER PUBLICATIONS

Mell et al., "The NIST Definition of Cloud Computing", National Institute of Standards and Technology, Information Technology Laboratory, Version 15, Oct. 7, 2009, 2 pages.

Fortuna, C. et al., "Dynamic Composition of Services for End-to-End Information Transport", Copyright 2009 EEE, 14 pages. http://carolinap.files.wordpress.com/2009/04/fortuna_mohorcic_v10x.pdf.

"Brocade One Data Center Cloud-Optimized Networks". Brocade One position paper, 5 pages. http://www.brocade.com/downloads/documents/white_papers/CloudOptimizedNetworks_GA-pp-350.pdf.

Jo, S. et al., "A Dynamic QoS Control Scheme for Videoconferencing in a Heterogeneous Internet", 21 pages. http://www.isoc.org/inet99/proceedings/4m/4m_1.htm.

"Deep packet inspection" from Wikipedia, 9 pages. http://en/wikipedia.aorg/wiki/Deep_packet_inspection.

"Quality of service" from Wikipedia, 11 pages. http://en.wikipedia.org/wiki/Quality_of-service.

"What is stateful inspection?", definition from Whatis.com, 13 pages. http://searchnetworking.techtarget.com/definition/stateful-inspection.

"Stateful inspection", word definition from Webopedia, 1 page. http://www.webopedia.com/TERM/S/stateful_inspection.html.

Tansupasiri, T. et al., "Using active networks technology for dynamic QoS", ACM Digital Library, 2 pages. http://portal.acm.org/citation.cfm?id=1167651.

"Quality of Service (Qos)", The TCP/IP Guide, 3 pages. http://www.tcpipguide.com/free/t_QualityofServiceQoS.htm.

Viet Duy Vu, USPTO Office Action, U.S. Appl. No. 13/185,587, Notification Date Feb. 15, 2013, 13 pages.

Viet Duy Vu, USPTO Notice of Allowance and Fee(s) Due, U.S. Appl. No. 13/185,587, Date Mailed May 14, 2013, 11 pages.

Maitland, J., "Keeping Control Isn't Easy", Chapter 4: Cloud-Based Infrastructure, SearchCloudComputing.com, Publication Date: Oct. 2009, 17 pages.

"Brocade One Data Center Cloud-Optimized Networks". Brocade One position paper, 5 pages. http://www.brocade.com/downloads/documents/white_papers/CloudOptimizedNetworks_GA-pp-350.pdf., Jan. 2011.

Jo, S. et al., "A Dynamic QoS Control Scheme for Videoconferencing in a Heterogeneous Internet", 21 pages. http://www.isoc.org/inet99/proceedings/4m/4m_1.htm., Jun. 22, 2011.

"Deep packet inspection" from Wikipedia, 9 pages. http://en/wikipedia.aorg/wiki/Deep_packet_inspection., Jun. 22, 2011.

"Quality of service" from Wikipedia, 11 pages. http://en.wikipedia.org/wiki/Quality_of-service, Jun. 22, 2011.

"What is stateful inspection?", definition from Whatis.com, 13 pages. http://searchnetworking.techtarget.com/definition/stateful-inspection, Jun. 22, 2011.

"Stateful inspection", word definition from Webopedia, 1 page. http://www.webopedia.com/TERM/S/stateful_inspection.html., Jun. 22, 2011.

Tansupasiri, T. et al., "Using active networks technology for dynamic QoS", ACM Digital Library, 2 pages. http://portal.acm.org/citation.cfm?id=1167651, Jun. 22, 2011.

"Quality of Service (Qos)", The TCP/IP Guide, 3 pages. http://www.tcpipguide.com/free/t_QualityofServiceQoS.htm., Sep. 30, 2005, Jun. 22, 2011.

* cited by examiner

US 9,191,283 B2

PRIORITIZING DATA PACKETS ASSOCIATED WITH APPLICATIONS RUNNING IN A NETWORKED COMPUTING ENVIRONMENT

CROSS-REFERENCE TO RELATED APPLICATION

The present patent document is a continuation of U.S. patent application Ser. No. 13/185,587, filed Jul. 19, 2011, entitled "PRIORITIZING DATA PACKETS ASSOCIATED WITH APPLICATIONS RUNNING IN A NETWORKED COMPUTING ENVIRONMENT", the disclosure of which is incorporated herein by reference.

TECHNICAL FIELD

In general, embodiments of the present invention relate to data packet prioritization. Specifically, embodiments of the present invention relate to the prioritization of data packets associated with applications running in a networked computing environment (e.g., a cloud computing environment) based on Service Level Agreement (SLA) compliance.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Challenges can exist in assigning a priority to data packets associated with applications running in networked computing environments (e.g., cloud computing environments) such that Service Level Agreements (SLAs) are met. For example, changing a priority of a set of data packets associated with one application can have detrimental effects on the capability of a second application to meet the terms of its respective SLA (e.g., because data packets associated with the second application may be assigned a lower priority).

SUMMARY

In general, embodiments of the present invention provide an approach for prioritizing a set of data packets associated with an application running in a networked computing environment (e.g., a cloud computing environment). In a typical embodiment, an SLA associated with a particular application and at least one other SLA associated with at least one other application are accessed (e.g., in a database or the like). A proposed modification to a priority of a set of data packets associated with the particular application (e.g., corresponding to a workload being processed via the particular application) is then determined based on a comparison of a current performance (e.g., transmission rate) of the set of data packets versus a specified performance of the set of data packets as set forth in the SLA. Then, an effect of the proposed modification on the capability of the particular application to meet a set of terms of the SLA, and of the at least one other application to meet a set of terms of the at least one other SLA will be evaluated. Based on this evaluation, it will be determined whether to implement the proposed modification. For example, the proposed modification can be implemented if it will not cause any of the SLAs to be unmet.

A first aspect of the present invention provides a computer-implemented method for prioritizing data packets associated with applications running in a networked computing environment, comprising: accessing, in a computer data structure, a Service Level Agreement (SLA) associated with a particular application and at least one other SLA associated with at least one other application, the particular application and the at least one other application running in the networked computing environment; determining a proposed modification to a priority of a set of data packets associated with the particular application based on a comparison of a current performance of the set of data packets against a specified performance of the set of data packets as set forth in the SLA; evaluating an effect of the proposed modification on a capability of the particular application to meet a set of terms of the SLA, and of the at least one other application to meet a set of terms of the at least one other SLA; and determining whether to implement the proposed modification based on the evaluating.

A second aspect of the present invention provides a system for prioritizing data packets associated with applications running in a networked computing environment, comprising: a bus; a processor coupled to the bus; and a memory medium coupled to the bus, the memory medium comprising instructions to: access, in a computer data structure, a Service Level Agreement (SLA) associated with a particular application and at least one other SLA associated with at least one other application, the particular application and the at least one other application running in the networked computing environment; determine a proposed modification to a priority of a set of data packets associated with the particular application based on a comparison of a current performance of the set of data packets against a specified performance of the set of data packets as set forth in the SLA; evaluate an effect of the proposed modification on a capability of the particular application to meet a set of terms of the SLA, and of the at least one other application to meet a set of terms of the at least one other SLA; and determine whether to implement the proposed modification based on the evaluating.

A third aspect of the present invention provides a computer program product for prioritizing data packets associated with applications running in a networked computing environment, the computer program product comprising a computer readable storage media, and program instructions stored on the computer readable storage media, to: access, in a computer data structure, a Service Level Agreement (SLA) associated with a particular application and at least one other SLA associated with at least one other application, the particular application and the at least one other application running in the networked computing environment; determine a proposed modification to a priority of a set of data packets associated with the particular application based on a comparison of a current performance of the set of data packets against a specified performance of the set of data packets as set forth in the SLA; evaluate an effect of the proposed modification on a capability of the particular application to meet a set of terms of the SLA, and of the at least one other application to meet a set of terms of the at least one other SLA; and determine whether to implement the proposed modification based on the evaluating.

A fourth aspect of the present invention provides a method for deploying a system for prioritizing data packets associated with applications running in a networked computing environment, comprising: providing a computer infrastructure being operable to: access, in a computer data structure, a Service Level Agreement (SLA) associated with a particular application and at least one other SLA associated with at least one other application, the particular application and the at least one other application running in the networked computing environment; determine a proposed modification to a priority of a set of data packets associated with the particular application based on a comparison of a current performance of the set of data packets against a specified performance of the set of data packets as set forth in the SLA; evaluate an effect of the proposed modification on a capability of the particular application to meet a set of terms of the SLA, and of the at least one other application to meet a set of terms of the at least one other SLA; and determine whether to implement the proposed modification based on the evaluating.

BRIEF DESCRIPTION OF THE DRAWINGS

These and other features of this invention will be more readily understood from the following detailed description of the various aspects of the invention taken in conjunction with the accompanying drawings in which.

Figure 1:
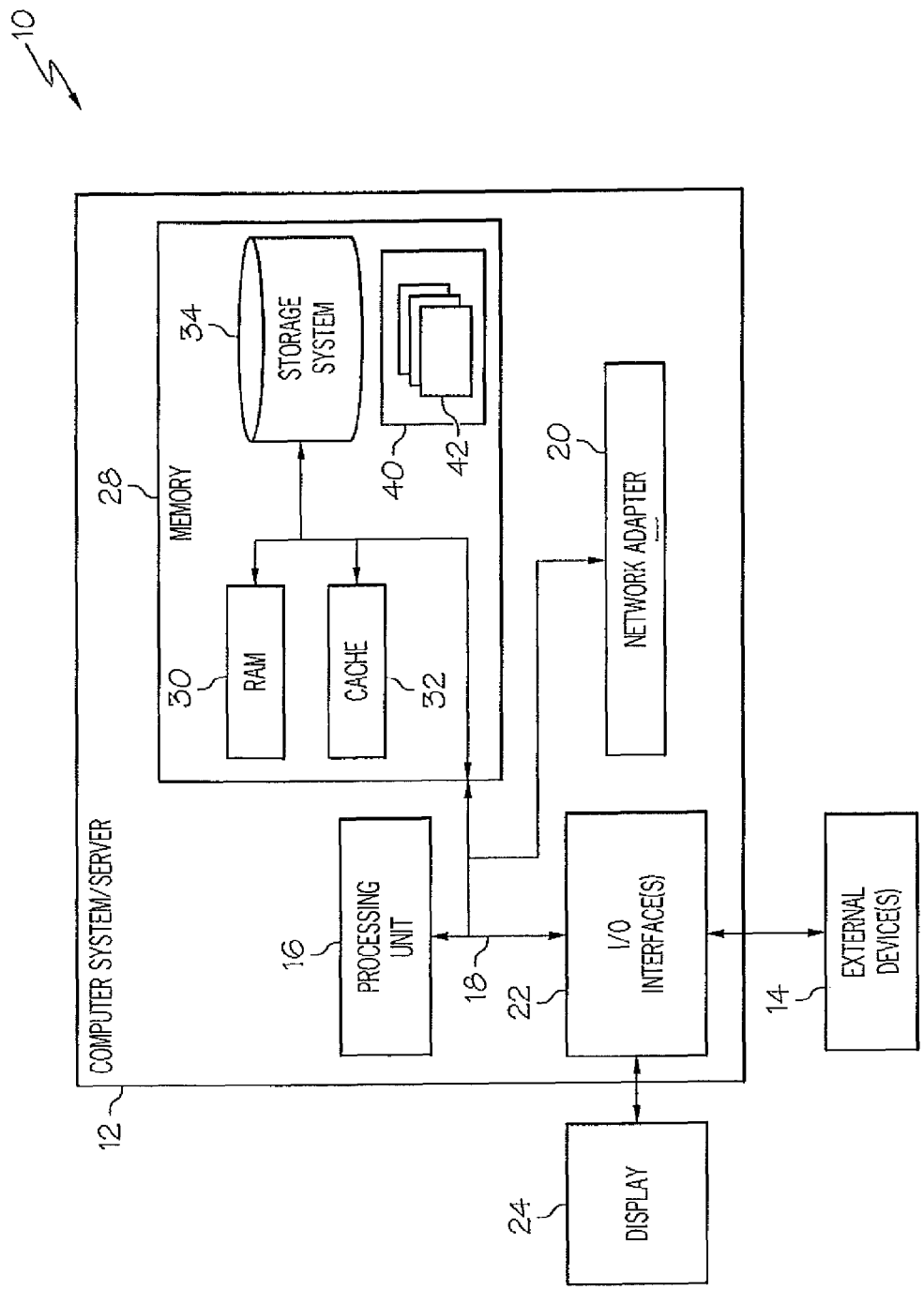
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for prioritizing a set of data packets associated with an application running in a networked computing environment (e.g., a cloud computing environment). In a typical embodiment, an SLA associated with a particular application and at least one other SLA associated with at least one other application are accessed (e.g., in a database or the like). A proposed modification to a priority of a set of data packets associated with the particular application (e.g., corresponding to a workload being processed via the particular application) is then determined based on a comparison of a current performance (e.g., transmission rate) of the set of data packets versus a specified performance of the set of data packets as set forth in the SLA. Then, an effect of the proposed modification on the capability of the particular application to meet a set of terms of the SLA, and of the at least one other application to meet a set of terms of the at least one other SLA will be evaluated. Based on this evaluation, it will be determined whether to implement the proposed modification. For example, the proposed modification can be implemented if it will not cause any of the SLAs to be unmet. It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
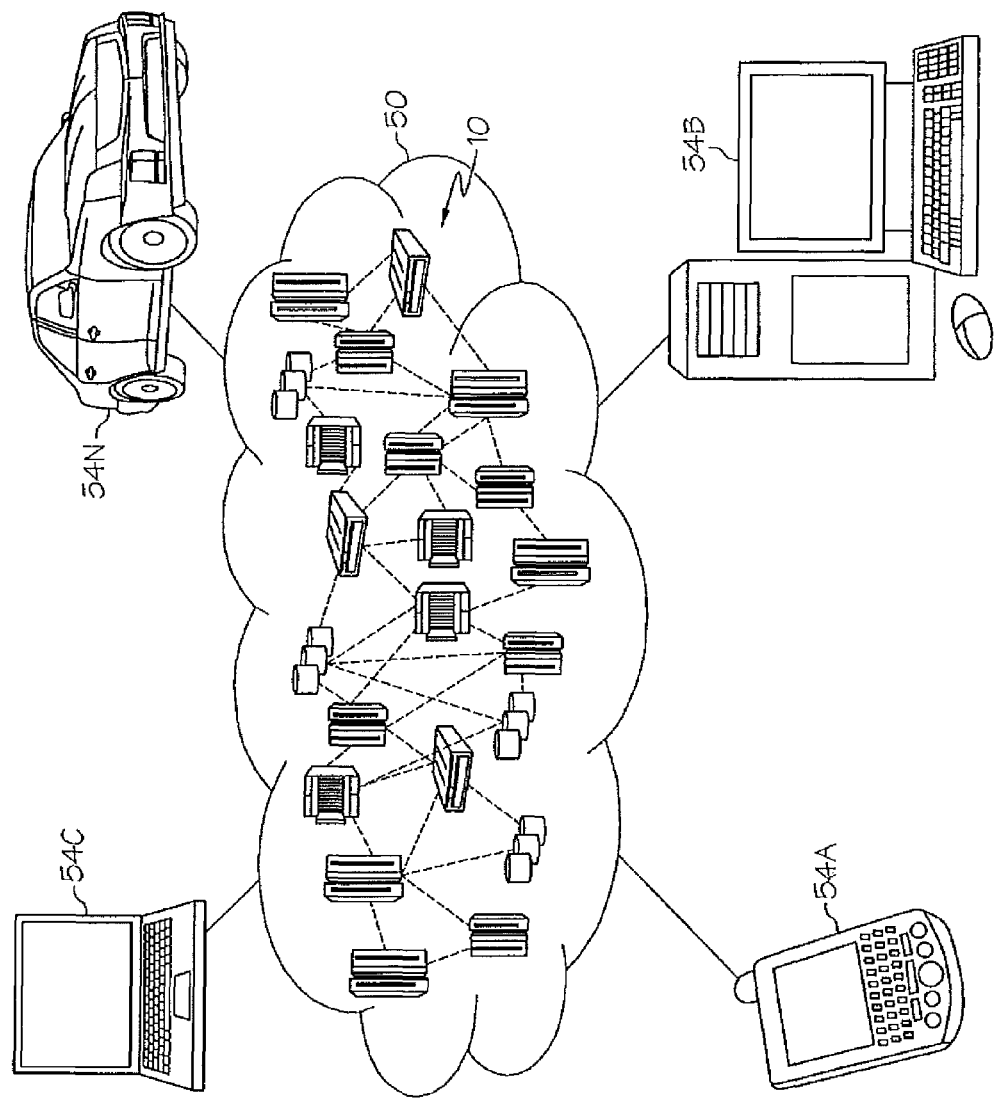
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
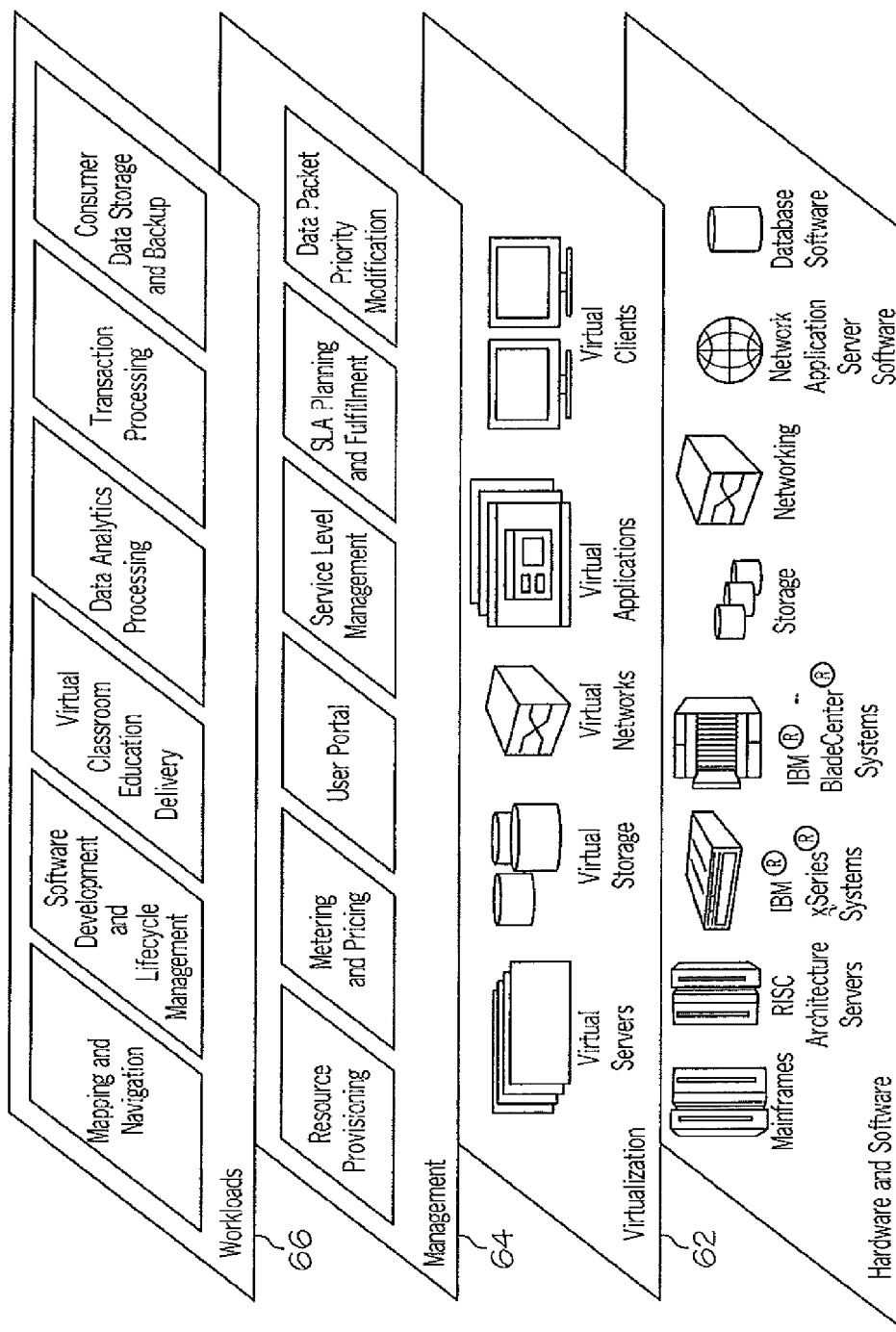
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software com5ponents. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is data packet priority modification, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the data packet priority modification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention provide an approach that monitors SLA information/data in network data packets through a network device/element (e.g., router(s), switch(es), node(s), endpoint(s), a virtual private network (VPN), network connection(s), network link(s), etc.), and then rebalances or reprioritizes Quality of Service (QoS) dynamically based on the data packet's parent application's SLA. In general, the embodiments of the present invention evaluates the effect of changing each data packet's QoS and priority, and determining how that in turn would affect (1) the application's underlying SLA terms with which that data packet is associated; and (2) the SLA's of other applications whose data packets are currently being evaluated.

Along these lines, embodiments of the present invention provide an broker/engine 70 (FIG. 4) that makes dynamic reprioritizations in a way that optimally meets all applications' SLA terms, or optimizes the collection of data packets so that the highest, or most critical, number of SLA's can be met. In general, this approach is based upon the insertion of new data within the Internet Protocol (IP) data packet, specifically the inclusion of SLA terms/data into the data packet header and/or payload. Such SLA data relates to the application or service to which that data packet belongs, could be inserted within the data packet, and then discovered using data packet inspection or deep data packet inspection techniques. Moreover, embodiments of the present invention provide an approach to optimally manage communications associated with multiple applications, so as to optimize SLA performance associated with those applications.

Figure 4:
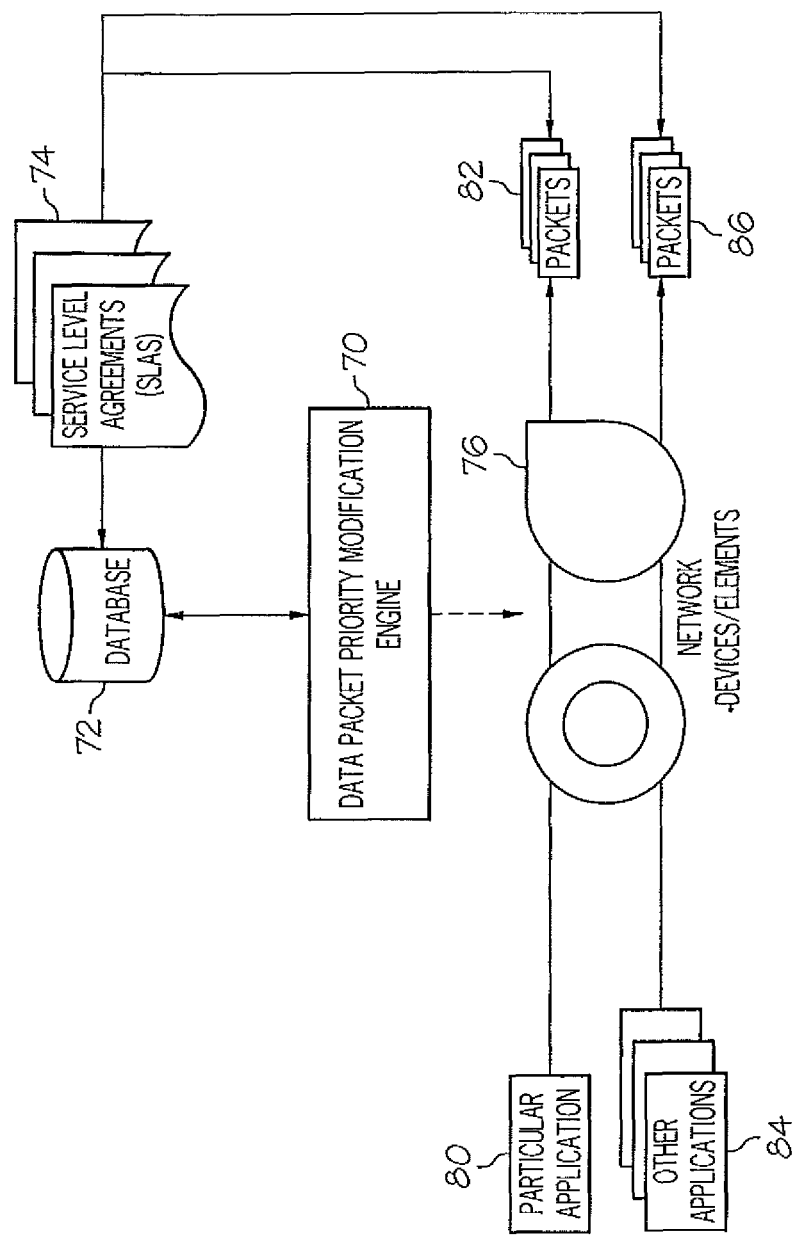
FIG. 4 depicts a system diagram according to an embodiment of the present invention.

Referring now to FIG. 4, a system diagram according to an embodiment of the present invention is shown. As depicted, the system comprises a data packet priority modification broker/engine 70 (referred to herein as engine 70) that is typically inserted into network elements 76 (e.g., a set of routers, a set of switches, a set of nodes, a set of endpoints, a virtual private network (VPN), a set of network connections, or a set of network links, etc.) and interfaces in a Transport Control Protocol (TCP) service layer to evaluate TCP/IP data packets 82 and 86 that contain qualitative SLA information about the parent application workload. Engine 70 will evaluate data packets' 82 qualitative data, and compares the qualitative data to data from other data packets 86 in the network elements 76. Engine 70 will then potentially reprioritize data packets 82 and 86, negotiate a new route, or take other action to maximize overall SLA performance.

In general, data packets 82 and 86 are associated with applications 80 and 84, respectively. Along these lines, data packets 82 and 86 are typically generated and/or communicated pursuant to a workload being processed/handled by applications 80 and 84. Although in a typical embodiment, engine 70 accesses SLA terms stored as metadata in data packets 82 and 86, this need not be the case. Rather, SLAs 74 (and/or terms thereof) could be accessed directly by engine 70 as database/repository 72. In either case, SLAs 74 and their underlying terms are ultimately accessed from a computer storage device such as database 72. In general, engine 70 will: inspect data packets 82 and 86 and their corresponding SLA; compare the current performance of data packets 82 versus that required by SLA 74 and do the same for other data packets 86 and their required SLAs; and reprioritizes data packet 82 based on all workloads and SLAs currently traversing the network elements 76.

In general, engine 70 can be implemented as utility/program 40 of FIG. 1 and can carry out all functions recited herein as depicted by the data packet priority modification function of FIG. 3. Along these lines, engine 70 could be, in one embodiment, software running on existing multipurpose processors within network devices. In another embodiment, engine 70 may be software running on dedicated processors within network elements 76. Such software could be written in numerous languages, but regardless of implementation, engine 70 would be a recognizable function within such devices. Network devices could include routers, switches, gateways, interface cards, nodes, endpoints, a virtual private network (VPN), network connections, network links, etc. In any of these cases, this software entity is responsible for performing the processes discussed below. Moreover, regardless of implementation, engine 70 will typically perform one or more of the functions described below.

Collect and Compare Process Collection:

Engine 70 performs inspection processes with respect to newly available SLA data. One aspect of this embodiment is that those portions of the data packet identifying performance against SLAs can be extracted from the incoming network traffic. Furthermore, such SLA information within the data packet can be either baseline or dynamic. Baseline SLA information contained within the data packet would explain in simple terms the criticality of the applications 80 and 84, and can include either simple quantification, or relative criticality, of that application's service level needs. Of particular relevance to this approach are criteria that can be impacted by network functionality, such as simple I/O measurements, response time requirements, or even dependencies upon other related applications. Another option made possible hereunder is that the data packets 82 and 86 may include dynamic SLA information, which could have either relative numbers, illustrating whether the application 80 and/or 84 currently has the potential to violate established SLAs (e.g., an application including flags to show that it has been running at a critical threshold, and is thus about to no longer meet the service level), or it could include both the baseline and recent empirical measures, by which the network elements 76 can extract both the requirements and empirical measures, and thus determine whether the application may possibly not meeting its service levels.

In general, baseline SLA information explains quantifiable metrics which the application needs to achieve (e.g., "response time in X milliseconds"). Alternatively, baseline SLA information can obtain relative criticality (e.g., "this is the most important application coming from this source system" or "this is the third most important process or communication coming from this application"). Dynamic SLA information could likely change over time and as the event state changes, and in some way indicates how the application is currently performing against its service level needs. This can be accomplished either explicitly (e.g., "recent performance is 103% of SLA) or implicitly (e.g., "SLA requirement is 100 millisecond, but recent data have achieved 103 millisecond responses."). In addition to the above SLA parameters, it is noted that differing SLA parameters could be used, including urgency (time), cost value, relevance to other tasks, security level, service level agreement, and other modifiers. Furthermore, in any of these cases, fiscal importance indicators can likewise be embedded in the communication data packet. Such fiscal markers can be used in conjunction with the above-mentioned baseline or dynamic SLA information to make final prioritization decisions.

Comparison:

When SLA data is extracted from the incoming data packet 82, it may be placed in any form of database, table, or comparative register. Such a register may exist nominally within the network elements 76, but may likewise exist at a remote (e.g., off-device) location. The comparison, and subsequent reprioritization, may occur in one of at least two places. For example, consider that within the physical/logical devices mentioned (e.g., switches and routers), both transactions and processing are occurring at relatively high rates of speed. In such a case, at an atomic level, the device is taking certain communication actions which may be described either as Receive;
Analysis and processing;
Enqueue for transmit; and
Transmit or directly:

Receive;
Analysis and processing; and
Transmit.

Such comparisons may be accomplished therefore at either the logical level of general data packet "analysis and processing," or it could occur (depending on device configuration) after the outbound data packet has been enqueued for transmission. In either case, the end effect will be substantially the same.

Reprioritization Process:

As above, the reprioritization may be accomplished therefore at either the logical level of general data packet 82 "analysis and processing," or it could occur (depending on device configuration) after the outbound data packet 82 has been enqueued for transmission. Basis for reprioritization may include many different specifics, but will share one of several basic approaches. Any of the below approaches may be used with or without consideration of fiscal measures. In other words, financial impact (e.g., cost of not meeting the SLA, or value earned if SLA is met) may or may not be applied along with one of the following techniques:

Prioritize outbound traffic according to highest stated priority.
Prioritize outbound traffic according to relative performance against SLAs.
Prioritization according to destination (e.g., stateful or stateless applications, or other real-time/batch considerations).

Such other reprioritization efforts may be accomplished using the data collected in the description of this invention.

Figure 5:
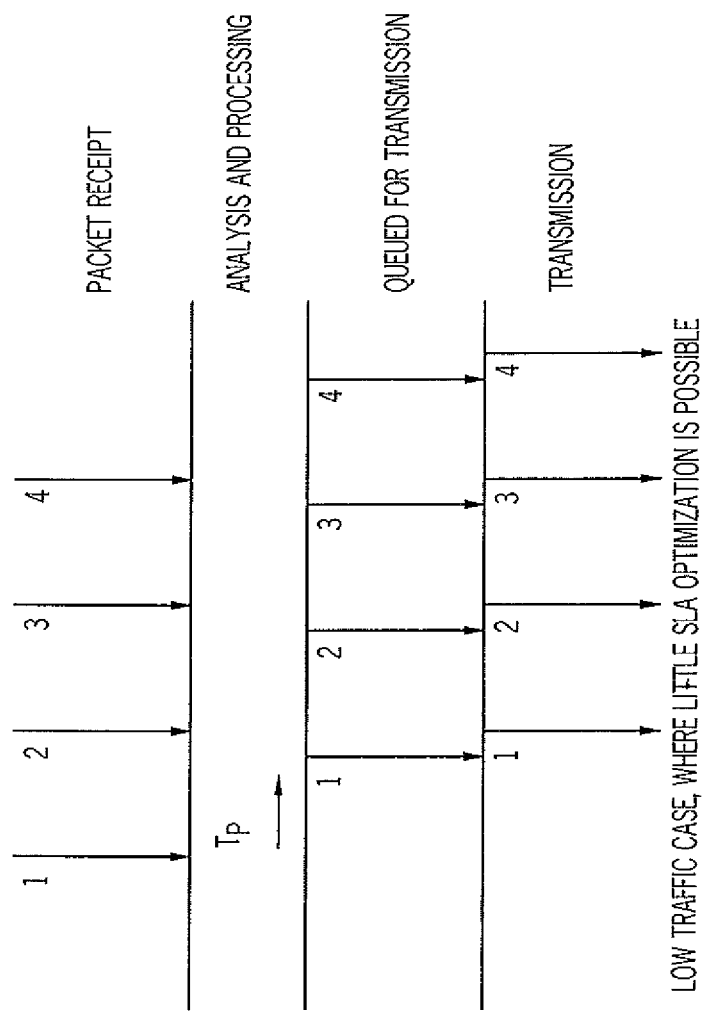
FIG. 5 depicts a diagram showing network traffic according to an embodiment of the present invention.
Figure 6:
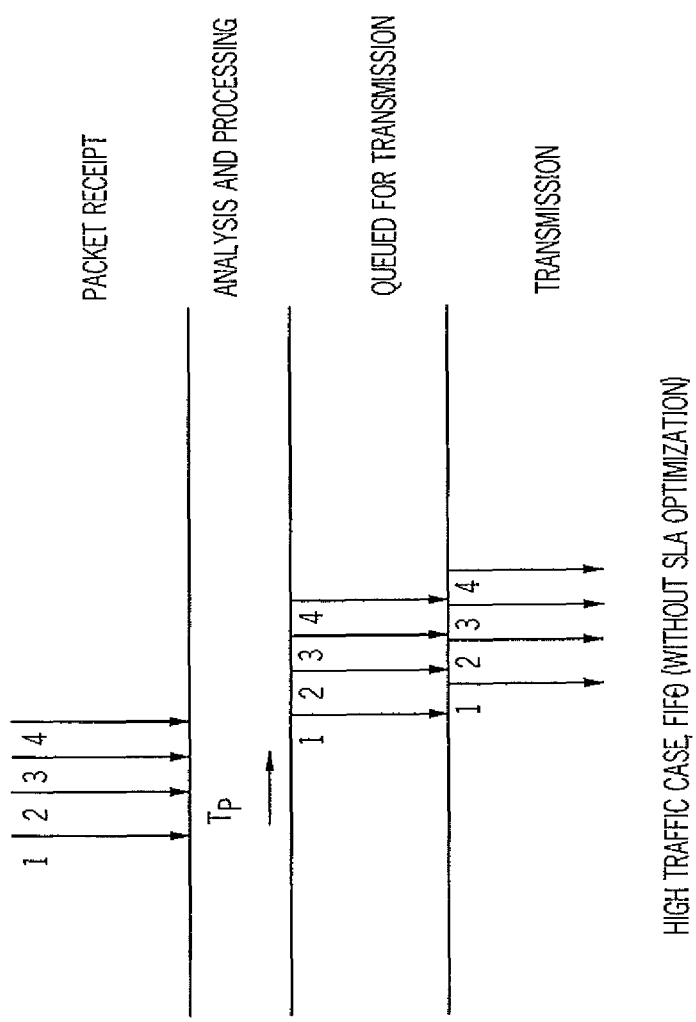
FIG. 6 depicts another diagram showing network traffic according to an embodiment of the present invention.
Figure 7:
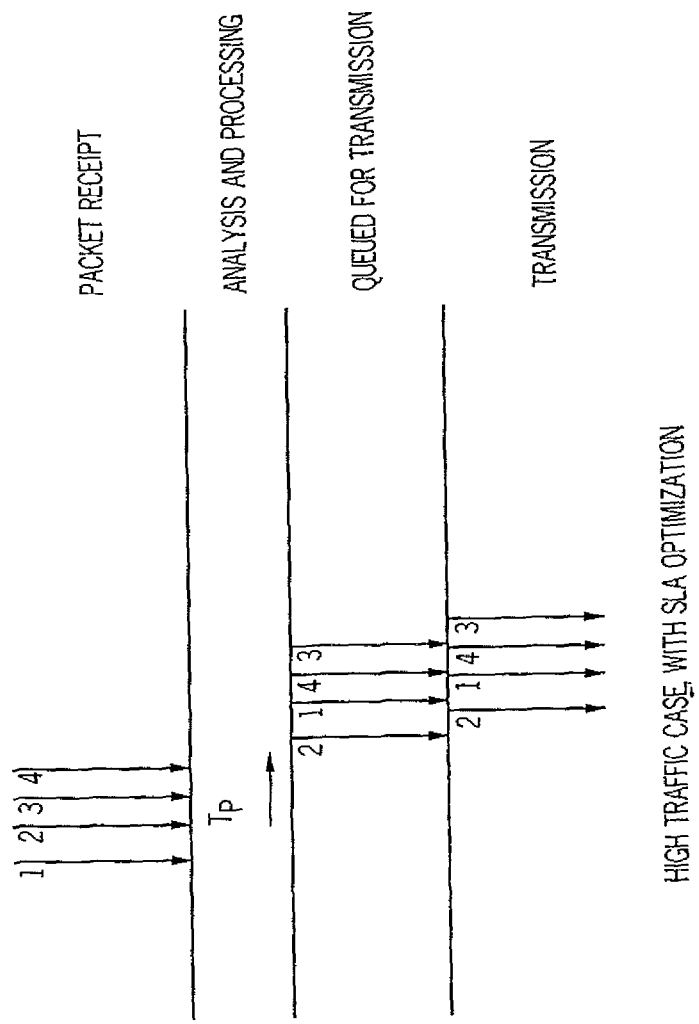
FIG. 7 depicts another diagram showing network traffic according to an embodiment of the present invention.

Referring now to FIGS. 5-7, three diagrams of incoming and outbound traffic at the network device levee (e.g., in atomic fashion) are depicted. FIG. 5 depicts a "low traffic case," where traffic density is relatively sparse, and incoming traffic is generally slow compared to the processing time of the network device. Although certain Quality of Service (QoS) parameters may still be modified, in many cases the signals (1-4) will be processed using simple first-in, first-out (FIFO) logic. In other words, the network device will operate in status quo methodologies, processing each traffic element (1-4) as it arrives while also honoring existing QoS methodologies.

FIGS. 6-7 depict a high traffic case without and with reprioritization. In this example, conventional behaviors may again be seen in the status-quo FIFO case. FIG. 6 depicts a scenario of traffic elements (1-4) throughput without reprioritization/SLA optimization. In this example, traffic elements (1-4) remain sequential through the process. However, in FIG. 7, traffic elements (1-4) have been reprioritized to the following order (2, 1, 4, and 3) to ensure SLA term compliance. In this case, the reprioritization is shown occurring during the "analysis and processing" stage, although it could likewise occur at the transmission queue. In either case, a prioritization has occurred to indicate to the "omniscient" network device that traffic should be reprioritized, in any of the ways previously described. Practical examples of the way this invention might be used are shown below. It is noted in advance, however, that special relevance can be given to cloud computing environments because network devices in these environments contend with many diverse traffic parameters, and achieving service level agreements may be directly related to revenue earned by the cloud service provider. By watching changing traffic QoS tied to upper layer SLAs, a cloud management layer can optimize network traffic to meet broader, systemic organizational objectives.

Example 1

Ten cloud jobs are ongoing. Nine are comfortably within their SLAs but the tenth is about to not meet agreed-upon service levels. All network traffic for the tenth job can be given a higher QoS priority so as to maximize chances that all jobs complete within established SLAs, based upon analysis of the embedded SLA data within the data packet(s).

Example 2

Five cloud jobs are ongoing. All are performing extremely close to their SLA, but fiscal impact data contained in data packet headers indicates that job 3 has the highest financial impact upon the organization. Job 3 is given prioritization to ensure the SLA (or terms thereof) is met, so as to maximize potential revenues to the provider.

Example 3

Five cloud jobs are ongoing and all are performing at equivalent levels and fiscal impacts within the given environment. However, job 1 has dependencies upon an external application, which seems to be running increasingly slowly. By increasing priority of job 1, the cloud provider can get this job to the external vendor more quickly, to mitigate the delays introduced by the external provider.

It is understood that the concepts discussed herein could be expanded to include multi-router optimization for cloud services. In this scenario, each router could leave a mark/breadcrumb on each data packet letting the next router know what changes were made by the previous hops in the path. This breadcrumb could allow a sort of communication between routers and a subsequent highly optimized multi-path reprioritization. In one example, a router may find a data packet is well within its SLA target but instead of holding it for 1000 milliseconds (ms), it might just hold it for 300 ms, and tag it with the router id that it was delayed 300 ms. Then, the next downstream router can evaluate the effect of the 300 ms, determine it is still within "safety" range and delay another 300 ms. The third hop/router then evaluates and sees that the combination of the 600 ms delay and changes in the application layer has caused it to reach a safety threshold in the SLA and therefore reprioritizes the data packet back up and processes it within 2 ms.

Figure 8:
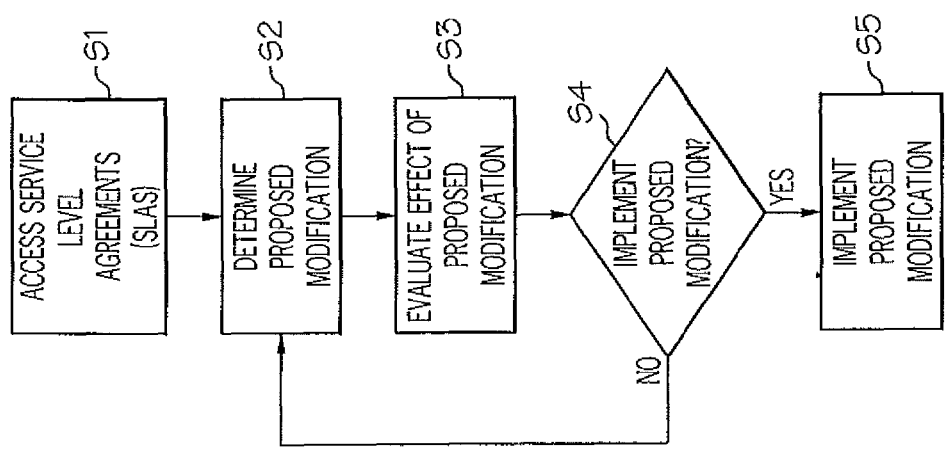
FIG. 8 depicts a method flow diagram according to an embodiment of the present invention.

Referring now to FIG. 8, a method flow diagram according to an embodiment of the present invention is shown. In step S1, a Service Level Agreement (SLA) (74 of FIG. 4) associated with a particular application (80 of FIG. 4) and at least one other SLA (74 of FIG. 4) associated with at least one other application (84 of FIG. 4) is accessed. In step S2, a proposed modification to a priority of a set of data packets (82 of FIG. 4) associated with the particular application is determined based on a comparison of a current performance of the set of data packets against a specified performance of the set of data packets as set forth in the SLA. In a typical embodiment, the proposed modification can comprise assigning a higher priority to the set of data packets compared to that of a set of other data packets associated with the at least one other application. In step S3, an effect of the proposed modification on a capability of the particular application to meet a set of terms of its SLA, and of the at least one other application to meet a set of terms of their respective SLAs is evaluated. This step can comprise: determining current speeds at which the set of data packets and the set of other data packets traverse elements (e.g., a set (at least one) of routers, a set of switches, a set of nodes, a set of endpoints, a virtual private network (VPN), a set of network connections, or a set of network links) of the networked computing environment; and comparing the current speeds to respective specified speeds set forth in the respective SLA and the at least one other SLA. In step S4, it is determined whether to implement the proposed modification based on the evaluation. Specifically, if the terms of the SLAs will be met, the proposed modification will be implemented in step S5. If not, the process returns to step S2 for adjustment of the proposed modification.

While shown and described herein as a data packet prioritization solution, it is understood that the invention further provides various alternative embodiments. For example, in one embodiment, the invention provides a computer-readable/useable medium that includes computer program code to enable a computer infrastructure to provide data packet prioritization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide data packet prioritization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for data packet prioritization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for prioritizing data packets associated with applications running in a networked computing environment, comprising:
   accessing, in a computer data structure, a Service Level Agreement (SLA) associated with a particular application and at least one other SLA associated with at least one other application, the particular application and the at least one other application running in the networked computing environment;
   determining a proposed modification to a priority of a set of data packets associated with the particular application based on a comparison of a current performance of the set of data packets against a specified performance of the set of data packets as set forth in the SLA;
   evaluating a potential effect of the proposed modification on a capability of the particular application to meet a set of terms of the SLA, and of the at least one other application to meet a set of terms of the at least one other SLA;
   determining whether to implement the proposed modification based on the evaluated potential effect of the proposed modification;

marking, by a device, the set of data with a mark comprising an indication of any implemented proposed modification;

determining, by another device downstream from the device, any proposed modification implemented based on the mark;

evaluating an actual effect of any implemented proposed modification; and determining whether another proposed modification to the priority of the set of data packets is safe to implement based on the SLA and the evaluated actual effect of the any implemented proposed modification.

2. The computer-implemented method of claim 1, the proposed modification comprising assigning a higher priority to the set of data packets as compared to that of a set of other data packets associated with the at least one other application.

3. The computer-implemented method of claim 2, the evaluating an effect of the proposed modification comprising determining current speeds at which the set of data packets and the set of other data packets traverse elements of the networked computing environment, the elements comprising at least one of the following: a set of routers, a set of switches, a set of nodes, a set of endpoints, a virtual private network (VPN), a set of network connections, or a set of network links.

4. The computer-implemented method of claim 3, further comprising comparing the current speeds to respective specified speeds set forth in the respective SLA and the at least one other SLA.

5. The computer-implemented method of claim 1, the set of data packets corresponding to a workload being processed via the application 6. The computer-implemented method of claim 1, the determining whether to implement the proposed modification comprising determining whether to implement the proposed modification if the set of terms of the SLA and the set of terms of the at least one other SLA will be met after the proposed modification has been implemented.

7. The computer-implemented method of claim 1, the networked computing environment comprising a cloud computing environment.

8. The method of claim 1, wherein a service solution provider provides a computer infrastructure that performs the method for one or more consumers.

9. A system for prioritizing data packets associated with applications running in a networked computing environment, comprising:
a bus;
a processor coupled to the bus; and
a memory medium coupled to the bus, the memory medium comprising instructions to:
access, in a computer data structure, a Service Level Agreement (SLA) associated with a particular application and at least one other SLA associated with at least one other application, the particular application and the at least one other application running in the networked computing environment;
determine a proposed modification to a priority of a set of data packets associated with the particular application based on a comparison of a current performance of the set of data packets against a specified performance of the set of data packets as set forth in the SLA;
evaluate a potential effect of the proposed modification on a capability of the particular application to meet a set of terms of the SLA, and of the at least one other application to meet a set of terms of the at least one other SLA; and determine whether to implement the proposed modification based on the evaluated potential effect of the proposed modification;

mark, by a device, the set of data with a mark comprising an indication of any implemented proposed modification;

determine, by another router downstream from the device, any proposed modification implemented based on the mark;

evaluate an actual effect of any implemented proposed modification; and determine whether another proposed modification to the priority of the set of data packets is safe to implement based on the SLA and the evaluated actual effect of the any implemented proposed modification.

10. The system of claim 9, the proposed modification comprising a proposed assignment of a higher priority to the set of data packets as compared to that of a set of other data packets associated with the at least one other application.

11. The system of claim 10, the memory medium further comprising instructions to determine current speeds at which the set of data packets and the set of other data packets traverse elements of the networked computing environment, the elements comprising at least one of the following: a set of routers, a set of switches, a set of nodes, a set of endpoints, a virtual private network (VPN), a set of network connections, or a set of network links.

12. The system of claim 9, the set of data packets corresponding to a workload being processed via the application 13. The system of claim 9, the memory medium further comprising instructions to determine whether to implement the proposed modification if the set of terms of the SLA and the set of terms of the at least one other SLA will be met after the proposed modification has been implemented.

14. The system of claim 9, the networked computing environment comprising a cloud computing environment.

15. A computer program product for prioritizing data packets associated with applications running in a networked computing environment, the computer program product comprising a computer readable storage media, and program instructions stored on the computer readable storage media, to:
access, in a computer data structure, a Service Level Agreement (SLA) associated with a particular application and at least one other SLA associated with at least one other application, the particular application and the at least one other application running in the networked computing environment;
determine a proposed modification to a priority of a set of data packets associated with the particular application based on a comparison of a current performance of the set of data packets against a specified performance of the set of data packets as set forth in the SLA;
evaluate a potential effect of the proposed modification on a capability of the particular application to meet a set of terms of the SLA, and of the at least one other application to meet a set of terms of the at least one other SLA; and
determine whether to implement the proposed modification based on the evaluated potential effect of the proposed modification;
mark, by a device, the set of data with a mark comprising an indication of any implemented proposed modification;
determine, by another device downstream from the router, any proposed modification implemented based on the mark;

evaluate an actual effect of any implemented proposed modification; and determine whether another proposed modification to the priority of the set of data packets is safe to implement based on the SLA and the evaluated actual effect of the any implemented proposed modification.

16. The computer program product of claim 15, the proposed modification comprising a proposed assignment of a higher priority to the set of data packets as compared to that of a set of other data packets associated with the at least one other application.

17. The computer program product of claim 16, the memory medium further comprising instructions to determine current speeds at which the set of data packets and the set of other data packets traverse elements of the networked computing environment, the elements comprising at least one of the following: a set of routers, a set of switches, a set of nodes, a set of endpoints, a virtual private network (VPN), a set of network connections, or a set of network links.

18. The computer program product of claim 17, the memory medium further comprising instructions to compare the current speeds to respective specified speeds set forth in the respective SLA and the at least one other SLA.

19. The computer program product of claim 15, the memory medium further comprising instructions to determine whether to implement the proposed modification if the set of terms of the SLA and the set of terms of the at least one other SLA will be met after the proposed modification has been implemented.

20. The computer program product of claim 15, the networked computing environment comprising a cloud computing environment.

* * * * *